United States Patent
Heo et al.

(10) Patent No.: US 11,327,562 B2
(45) Date of Patent: May 10, 2022

(54) METHOD AND APPARATUS FOR TRACKING EYE BASED ON EYE RECONSTRUCTION

(71) Applicant: SAMSUNG ELECTRONICS CO., LTD., Suwon-si (KR)

(72) Inventors: Jingu Heo, Yongin-si (KR); Dongwoo Kang, Seoul (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 16/895,600

(22) Filed: Jun. 8, 2020

(65) Prior Publication Data
US 2021/0173476 A1 Jun. 10, 2021

(30) Foreign Application Priority Data
Dec. 10, 2019 (KR) .................. 10-2019-0163642

(51) Int. Cl.
| | | |
|---|---|---|
| *G06F 3/01* | (2006.01) | |
| *G06T 7/254* | (2017.01) | |
| *G06T 7/246* | (2017.01) | |

(52) U.S. Cl.
CPC .............. *G06F 3/013* (2013.01); *G06T 7/246* (2017.01); *G06T 7/254* (2017.01); *G06T 2207/30201* (2013.01)

(58) Field of Classification Search
CPC ..... G06F 3/013; G06F 3/011; G06K 9/00604; G06K 9/0061; G06K 9/6247; G06T 15/20; G06T 19/20; G06T 2207/30201; G06T 7/254; G06T 7/74; G06T 7/246; G06T 5/002; G06T 5/50
See application file for complete search history.

(56) References Cited

U.S. PATENT DOCUMENTS

| | | | |
|---|---|---|---|
| 2004/0005083 A1* | 1/2004 | Fujimura | A61B 3/113 382/103 |
| 2010/0316263 A1 | 12/2010 | Hamza | |
| 2012/0170027 A1* | 7/2012 | Tsukizawa | G06T 7/00 356/124 |
| 2013/0170754 A1* | 7/2013 | Tsukizawa | G06K 9/00845 382/195 |

(Continued)

FOREIGN PATENT DOCUMENTS

| | | |
|---|---|---|
| JP | 3045129 B2 | 3/2000 |
| KR | 10-2018-0044331 A | 5/2018 |

OTHER PUBLICATIONS

A Fatigue Detection System with Eyeglasses Removal (Year: 2013).*

(Continued)

*Primary Examiner* — Nizar N Sivji
(74) *Attorney, Agent, or Firm* — Sughrue Mion, PLLC

(57) ABSTRACT

An eye reconstruction-based eye tracking method and apparatus are provided. The eye tracking method includes generating a reconstructed image by performing eye reconstruction with respect to an input image, determining a difference value between the input image and the reconstructed image, selecting one of the input image, the reconstructed image, and a replacement image as a target image based on the determined difference value, and performing eye tracking based on the target image.

18 Claims, 12 Drawing Sheets

(56) References Cited

U.S. PATENT DOCUMENTS

| | | | |
|---|---|---|---|
| 2014/0205143 A1* | 7/2014 | Zhang | G06K 9/00845 382/103 |
| 2016/0140390 A1* | 5/2016 | Ghosh | G06K 9/00617 348/78 |
| 2016/0196465 A1* | 7/2016 | Wu | G06T 3/40 382/203 |
| 2017/0024907 A1* | 1/2017 | Bermano | G06T 17/20 |
| 2017/0053211 A1 | 2/2017 | Heo et al. | |
| 2017/0083754 A1* | 3/2017 | Tang | G06K 9/00288 |
| 2017/0154423 A1 | 6/2017 | Heo et al. | |
| 2017/0186138 A1 | 6/2017 | Raducan et al. | |
| 2017/0308734 A1* | 10/2017 | Chalom | G06K 9/6267 |
| 2018/0098057 A1* | 4/2018 | Heo | G06K 9/00261 |
| 2019/0129165 A1* | 5/2019 | Kang | G06F 3/013 |
| 2019/0130579 A1 | 5/2019 | Heo et al. | |
| 2019/0143989 A1 | 5/2019 | Oba | |
| 2019/0163267 A1 | 5/2019 | Hainzl et al. | |

OTHER PUBLICATIONS

Park et al., "Glasses Removal from Facial Image Using Recursive Error Compensation," IEEE Transactions on Pattern Analysis and Machine Intelligence, vol. 27, No. 5, May 1, 2005, XP 011128404, pp. 805-811 (7 pages).

Wu et al., "Automatic Eyeglasses Removal from Face Images," IEEE Transactions on Pattern Analysis and Machine Intelligence, vol. 26, No. 3, Mar. 1, 2004, XP 011106115, pp. 322-336 (15 pages).

Lazarus et al., "A Low Rank Model based Improved Eye Detection under Spectacles," 2016 IEEE 7th Annual Ubiquitous Computing, Electronics & Mobile Communication Conference (UEMCON), IEEE, Oct. 20, 2016, XP 033019581, 6 pages.

Communication dated Feb. 5, 2021 issued by the European Patent Office in corresponding European Application No. 20191104.7.

\* cited by examiner

METHOD AND APPARATUS FOR TRACKING EYE BASED ON EYE RECONSTRUCTION

CROSS-REFERENCE TO RELATED APPLICATION

This application claims priority to Korean Patent Application No. 10-2019-0163642, filed on Dec. 10, 2019 in the Korean Intellectual Property Office, the disclosure of which is incorporated herein by reference in its entirety.

BACKGROUND

1. Field

Methods and apparatuses consistent with example embodiments relate to a method and apparatus for tracking an eye based on eye reconstruction.

2. Description of Related Art

A head-up display (HUD) device provides a variety of driving information helpful for a driver to drive, by displaying a virtual image in front of the driver. Recently, three-dimensional (3D) HUD devices are in development. For example, a 3D HUD device uses augmented reality (AR). In this example, driving information is displayed to overlap an actual object, such that the driver may more intuitively recognize the driving information. There are currently various types of 3D displays. Among those 3D displays, an eye-tracking 3D display with a relatively high resolution and a relatively high degree of freedom may be applied to the 3D HUD device.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an eye tracking method including generating a reconstructed image by performing eye reconstruction with respect to an input image, determining a difference value between the input image and the reconstructed image, selecting one of the input image, the reconstructed image, and a replacement image as a target image based on the determined difference value, and performing eye tracking based on the target image.

The performing the eye reconstruction may include reducing a noise component in the input image.

The generating may include generating the reconstructed image based on a portion having a high priority among principal component vectors corresponding to the input image, and wherein each of the principal component vectors corresponds to an eigenface predetermined based on a principal component analysis on various face images.

The selecting may include selecting the input image as the target image based on the determined difference value being less than a first threshold, selecting the reconstructed image as the target image based on the determined difference value being greater than the first threshold and less than a second threshold, and selecting the replacement image as the target image based on the determined difference value being greater than the second threshold, wherein the second threshold is greater than the first threshold.

The replacement image may be different from the input image and the reconstructed image, respectively.

The eye tracking method may further include selecting a sample image having a highest similarity to the input image, among sample images stored in a database, as the replacement image.

The highest similarity may be determined based on a comparison between feature points of the input image and corresponding feature points of each of the sample images.

The feature points of the input image and the corresponding feature points of each of the sample images may be each extracted from a region except for eyes.

The sample images may correspond to images having previously succeeded in eye tracking.

The eye tracking method may further include storing the input image as a sample image in a database based on the eye tracking being successful based on the input image or the reconstructed image.

The eye tracking method may further include performing eye detection with respect to the input image, wherein the generating is performed based on the eye detection being successful with respect to the input image.

Based on the replacement image being selected as the target image, the performing eye tracking may include performing the eye tracking based on eye position information mapped to the replacement image.

A non-transitory computer-readable storage medium storing instructions that, when executed by a processor, may cause the processor to perform the eye tracking method.

According to another aspect of an example embodiment, there is provided an electronic device including a camera configured to obtain an input image of a user, a processor configured to execute instructions to generate a reconstructed image by performing eye reconstruction with respect to the input image, select, as a replacement image, a sample image among sample images stored in a database that has a highest similarity to the input image, determine a difference value between the input image and the reconstructed image, select one of the input image, the reconstructed image, and the replacement image as a target image based on the determined difference value, and perform eye tracking on the target image, and a memory configured to store the instructions executable by the processor.

According to yet another aspect of an example embodiment, there is provided an eye tracking apparatus including a processor configured to execute instructions to generate a reconstructed image by performing eye reconstruction with respect to an input image, determine a difference value between the input image and the reconstructed image, determine a target image by selecting one of the input image, the reconstructed image, and a replacement image based on the determined difference value, and perform eye tracking on the target image, and a memory configured to store the instructions executable by the processor.

The processor may be further configured to generate the reconstructed image based on a portion having a high priority among principal component vectors corresponding to the input image, and wherein each of the principal component vectors corresponds to an eigenface predetermined based on a principal component analysis on various face images.

The processor may be further configured to select the input image as the target image based on the determined difference value being less than a first threshold, select the reconstructed image as the target image based on the determined difference value being greater than the first threshold and less than a second threshold, and select the replacement image as the target image based on the determined difference value being greater than the second threshold, wherein the second threshold is greater than the first threshold.

The processor may be further configured to select a sample image having a highest similarity to the input image, among sample images stored in a database, as the replacement image.

The highest similarity may be determined based on a comparison between feature points of the input image and corresponding feature points of each of the sample images, and wherein the feature points of the input image and the corresponding feature points of each of the sample images are each extracted from a region except for eyes.

Based on the replacement image being selected as the target image, the processor may be further configured to perform the eye tracking based on eye position information mapped to the replacement image.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
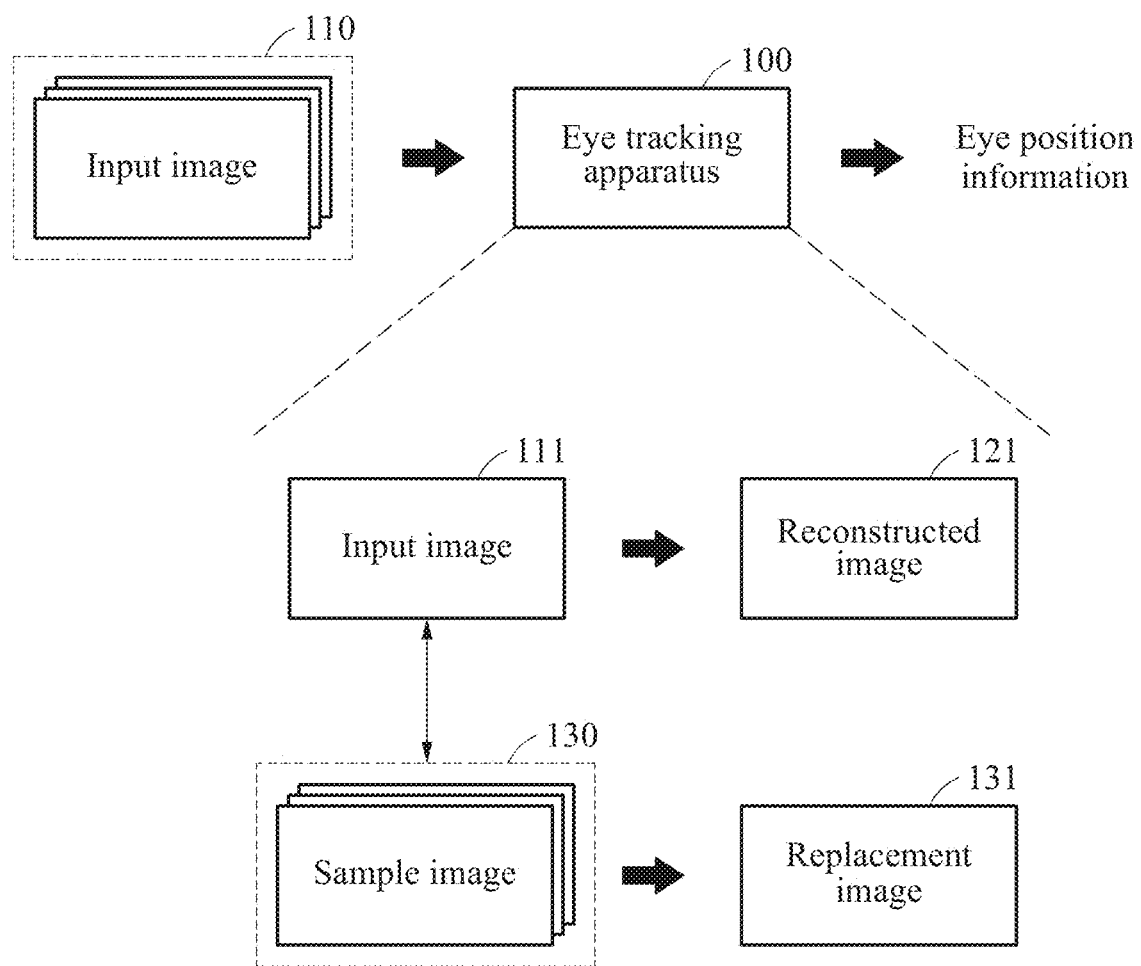
FIG. 1 illustrates an operation of an eye tracking apparatus using an input image, a reconstructed image, and a replacement image according to an example embodiment.

The following detailed structural or functional description is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as "first," "second," and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. In the drawings, like reference numerals are used for like elements.

FIG. 1 illustrates an operation of an eye tracking apparatus using an input image, a reconstructed image, and a replacement image according to an example embodiment. Referring to FIG. 1, an eye tracking apparatus 100 may perform eye tracking with respect to an input image 110 and output eye position information as a result of the eye tracking. The input image 110 may include a face of a user, for example, a viewer or a driver. The eye position information may be used for various applications, such as autostereoscopic three-dimensional (3D) display and driver state monitoring. The autostereoscopic 3D display may include various types of displays, for example, a 3D head-up display (HUD), a 3D television (TV), and a 3D mobile device.

The autostereoscopic 3D display may display different images to both eyes of the user. To implement the foregoing, position information of the eyes of the user may be required. For example, a left image for a left eye and a right image for a right eye may be prepared to provide a 3D image to the user. In this example, a 3D display device determines positions of the left eye and the right eye of the user based on the eye position information and provides the left image to the position of the left eye and the right image to the position of the right eye. In this way, the user may view the 3D image.

When the input image 110 is generated by capturing the user while light is sufficient and the eyes of the user are completely revealed, the eyes of the user may be relatively easily tracked. When the input image 110 is generated by capturing the user while light is insufficient, the eyes of the user are covered with sunglasses, or there is a light reflection component around the eyes of the user, it may be more difficult to track the eyes of the user. The eye tracking apparatus 100 according to the example embodiment may selectively use the input image 110, a reconstructed image 121, and a replacement image 131 depending on a situation, thereby more successfully performing eye tracking even when it is more difficult to track the eyes of the user based on an inadequate environment.

The input image 110 may be a video including a plurality of frames. An input image 111 may correspond to one frame of the input image 110. An eye tracking process according to an example embodiment may be performed sequentially with respect to the respective frames of the input image 110.

When the input image 111 is received, the eye tracking apparatus 100 may generate the reconstructed image 121 by performing eye reconstruction with respect to the input image 111. The eye reconstruction may include various techniques of reducing noise components in the input image 111. For example, the noise component may include a high-frequency component, for example, light reflected from glasses, or halo, and an occlusion component, for example, sunglasses, thick glasses, or hair. Dimension reduction through a principal component analysis (PCA) may be used for eye reconstruction.

When the reconstructed image 121 is generated, the eye tracking apparatus 100 may determine a difference between the input image 111 and the reconstructed image 121 by comparing the input image 111 with the reconstructed image 121. Hereinafter, the determined difference may correspond to a difference value. For example, the eye tracking apparatus 100 may determine the difference between the input image 111 and the reconstructed image 121 by comparing corresponding pixels of the input image 111 and the reconstructed image 121. The corresponding pixels may be pixels present at the same positions in the respective images.

The eye tracking apparatus 100 may determine a target image by selecting one of the input image 111, the reconstructed image 121, and the replacement image 131 based on the difference value. The target image may be an image being a target of eye tracking and correspond to one of the input image 111, the reconstructed image 121, and the replacement image 131. For example, if the difference value is less than a first threshold, the input image 111 may be selected as the target image. If the difference value is greater than the first threshold and less than a second threshold, the reconstructed image 121 may be selected as the target image. If the difference value is greater than the second threshold, the replacement image 131 may be selected as the target image. The second threshold may be greater than the first threshold.

The replacement image 131 may be different from the input image 111 and the reconstructed image 121, and selected from among sample images 130. The sample images 130 may include various images in states appropriate for eye tracking. A sample image having a highest similarity to the input image 111 may be selected from the sample images 130, as the replacement image 131. For example, a similarity between each sample image and the input image 111 may be determined based on a comparison between feature points of the input image 111 and feature points of each of the sample images 130.

The eye tracking apparatus 100 may select an image most appropriate for eye tracking from among the input image 111, the reconstructed image 121, and the replacement image 131 by comparing the similarity to a threshold. For example, if the input image 111 is appropriate for eye tracking, the input image 111 may be selected as the target image since there is a small difference, for example, a difference value less than the first threshold, between the input image 111 and the reconstructed image 121.

If the input image 111 includes a noise component such as light reflection, the reconstructed image 121 may be more appropriate for eye tracking than the input image 111. In this example, the noise component may be removed through eye reconstruction, and there may be a difference, for example, a difference value greater than the first threshold and less than the second threshold, between the input image 111 and the reconstructed image 121, due to the presence and absence of noise components in the input image 111. Thus, the reconstructed image 121 may be selected as the target image.

If there are many noise components in the input image 111 as in an example in which the user is wearing sunglasses, the replacement image 131 may be more appropriate for eye tracking than the input image 111 and the reconstructed image 121. In this example, there may be a great difference, for example, a difference value greater than the second threshold, between the input image 111 and the reconstructed image 121 during an eye reconstruction process, and thus the replacement image 131 may be selected as the target image.

Components interfering with eye tracking may be removed from components constituting the input image 111 through the eye reconstruction process. For example, through the eye reconstruction process, components corresponding to a general face may be maintained, and components not corresponding to the general face may be removed. One of the input image 111, the reconstructed image 121, and the replacement image 131 may be selected based on a proportion of the components removed from the input image 111 through the eye reconstruction process. For example, in the case of high-frequency components, the portion of removed components may be relatively low, and thus the reconstructed image 121 may be selected as the target image. In the case of occlusion components, the proportion of removed components may be relatively high, and thus the replacement image 131 may be selected as the target image.

When the target image is selected, the eye tracking apparatus 100 may generate eye position information by performing eye tracking with respect to the target image. The eye tracking apparatus 100 may sequentially receive the plurality of frames and track eyes in each frame. The eye position information may include positions of eyes present in each frame. For example, the positions of the eyes may be represented as coordinates of the eyes in the image.

Figure 2:
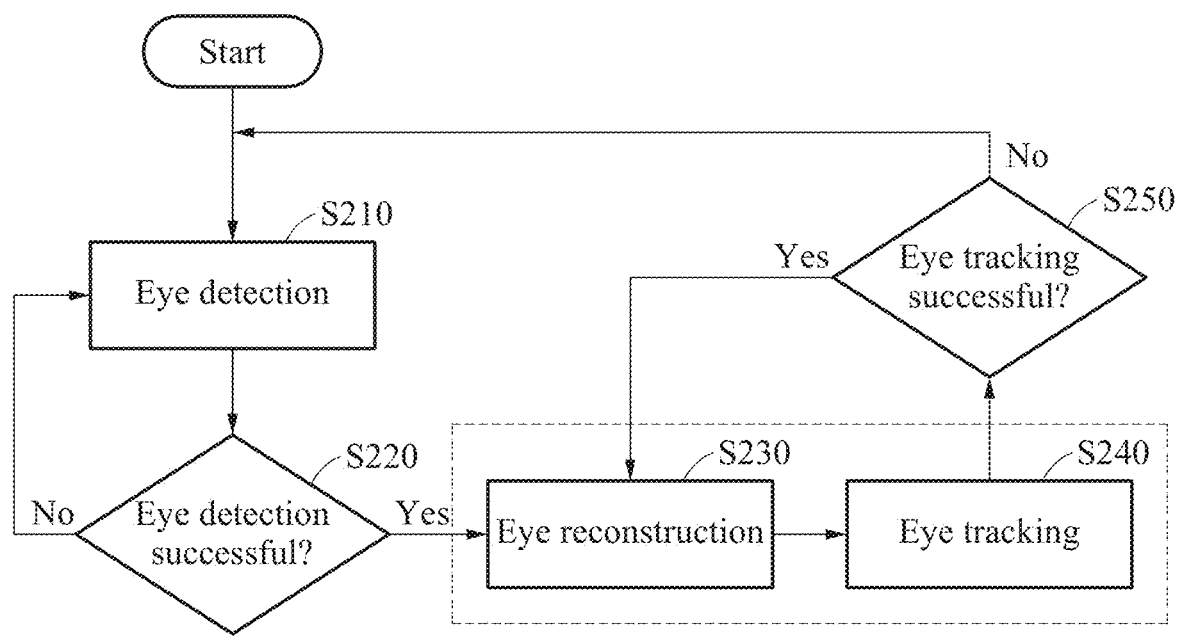
FIG. 2 is a flowchart illustrating an eye detection process and an eye tracking process according to an example embodiment.

FIG. 2 is a flowchart illustrating an eye detection process and an eye tracking process according to an example embodiment. Referring to FIG. 2, if a first frame of an input image is received, an eye tracking apparatus may perform eye detection with respect to the first frame of the input image (S210). The eye tracking apparatus may determine an eye detection region including the eyes of a user through the eye detection process. The eye tracking apparatus may then determine whether the eye detection is successful (S220). If the eye detection is failed, the eye tracking apparatus may perform eye detection with respect to a second frame of the input image (S210), and if the eye detection is successful (S220), the eye tracking apparatus may perform eye reconstruction (S230). That is, until the eye detection is determined to be successful, operations S210 and S220 may be iteratively performed with respect to each frame of the input image.

When the eye detection is successful for the first frame of the input image, the eye tracking apparatus may perform eye reconstruction with respect to the first frame of the input image (S230). After the eye reconstruction, a reconstructed image corresponding to the first frame of the input image and a replacement image may be generated, and one of the first frame of the input image, the reconstructed image, and the replacement image may be selected as a target image. Then the eye tracking apparatus may perform eye tracking with respect to the target image (S240). The eye tracking apparatus may determine an eye tracking region for eye tracking based on the eye detection region. The eye tracking apparatus may extract feature points in the eye tracking region and perform the eye tracking by aligning the extracted feature points.

Then the eye tracking apparatus may determine whether the eye tracking is successful (S250). If the eye tracking region includes the eyes of the user, it may be determined that the eye tracking is successful. If the eye tracking region does not include the eyes of the user, it may be determined that the eye tracking is unsuccessful. If the eye tracking is successful, the eye tracking apparatus may update the eye tracking region and perform eye reconstruction (S230) with respect to a second frame of the input image. For example, the eye tracking apparatus may adjust a position of the eye tracking region based on the positions of the eyes. For example, the eye tracking apparatus may adjust the position of the eye tracking region such that a midpoint between the eyes may be placed at the center of the eye tracking region. The eye tracking apparatus may determine a target image corresponding to the second frame of the input image and continue eye tracking using the target image and the updated eye tracking region.

Figure 3:
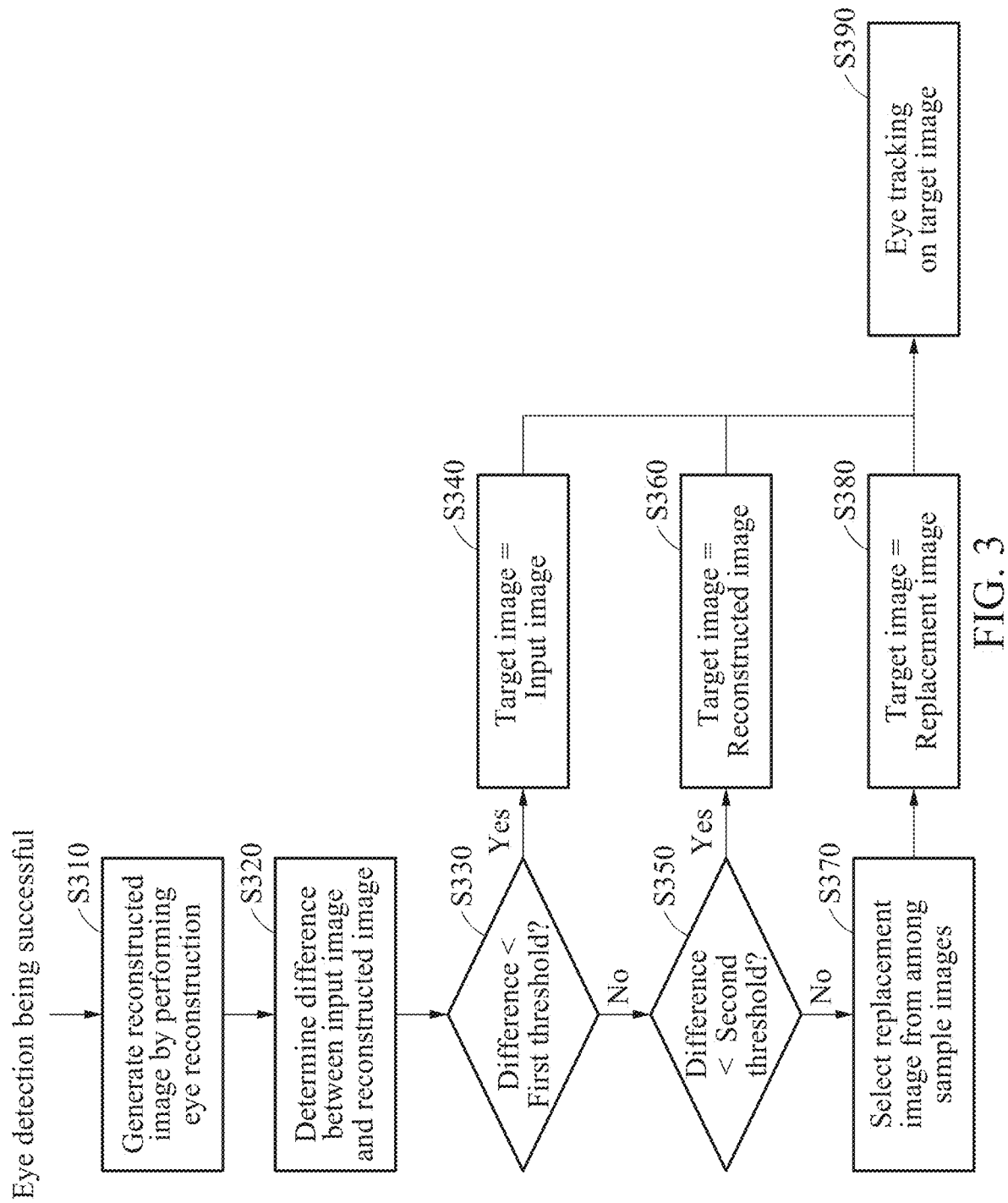
FIG. 3 is a flowchart illustrating a process of determining a target image and performing eye tracking according to an example embodiment.

FIG. 3 is a flowchart illustrating a process of determining a target image and performing eye tracking according to an example embodiment. S310 through S390 of FIG. 3 may correspond to S230 and S240 included in a dotted box in FIG. 2, and S310 may be performed when it is determined that the eye detection is successful in S220 of FIG. 2.

Referring to FIG. 3, in S310, the eye tracking apparatus may generate a reconstructed image by performing eye reconstruction. The eye reconstruction may include various techniques of reducing noise components in the input image. For example, dimension reduction through a PCA may be applied for eye reconstruction, which will be described further with reference to FIGS. 4 and 5.

Figure 4:
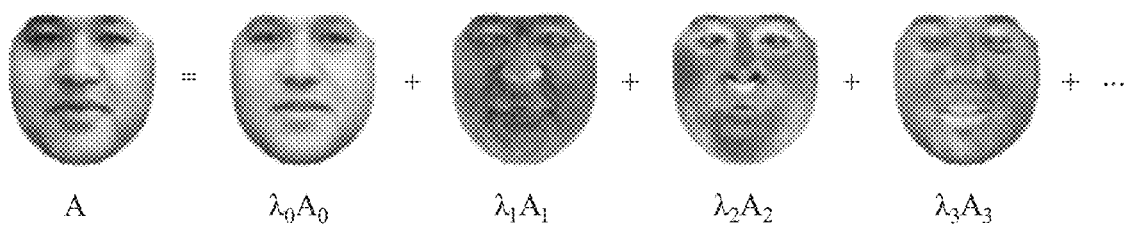
FIG. 4 illustrates an augmented appearance space according to an example embodiment.

FIG. 4 illustrates an augmented appearance space according to an example embodiment. Principal component vectors may be obtained by performing a PCA on various reference face images. The number of dimensions of the principal component vectors may be equal to the number of dimensions of data, for example, pixels, of each image. In this example, the principal component vectors ranging from dominant face components to exceptional face components may be obtained. The proportion of images including dominant face shapes in the reference face images may be relatively high. In this example, the dominant face components may correspond to a standard face, and the exceptional face components may correspond to noise. Since, the principal component vectors may be orthogonal to each other, face images in all input images may be represented through the principal component vectors.

The principal component vectors may be interpreted again into a face image, and thus the interpreted face image may be an eigenface. That is, eigenfaces may be determined based on a PCA on the various face images, and the principal component vectors may each correspond to an eigenface. A face image in an input image may be represented in an augmented appearance space using the eigenfaces.

Referring to FIG. 4, a face image A may be expressed by the sum of $\lambda_i A_i$. $A_i$ denotes the principal component vectors, and $\lambda_i$ denotes coefficients of the principal component vectors. $\lambda_i$ may also be referred to as appearance parameters. $\lambda_i$ may indicate the proportion of $A_i$ in the face image A. Based on the value of each $\lambda_i A_i$, face images as in FIG. 4 may be represented. The index i may have a value from 1 to n. $A_i$ with smaller i may be a component closer to a standard face, and $A_i$ with greater i may be a component closer to noise.

Figure 5:
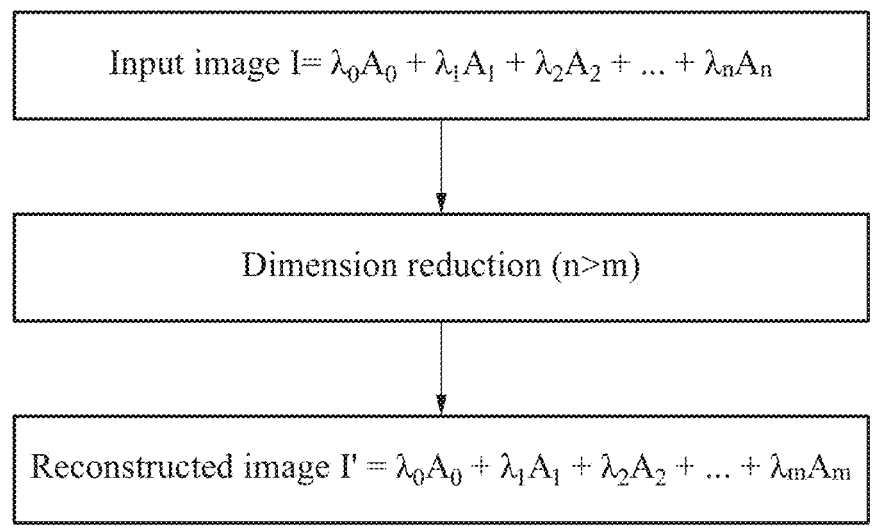
FIG. 5 illustrates an eye reconstruction process according to an example embodiment.

FIG. 5 illustrates an eye reconstruction process according to an example embodiment. Referring to FIG. 5, an input image I may be expressed by the sum of $\lambda_0 A_0$ to $\lambda_n A_n$, and a reconstructed image I' may be expressed by the sum of $\lambda_0 A_0$ to $\lambda_m A_m$. n may be greater than m, and thus the dimensions may be reduced by eye reconstruction. Further, components with relatively great indices, for example, components that are relatively similar to noise, may be removed from the input image I, and thus noise components such as high-frequency components or occlusion components may be removed from the input image I. In the input image I, $\lambda_{m+1} I_{m+1}$ or $\lambda_n A_n$ may be referred to as a removed component or a noise component. A principal component vector with a smaller index may be represented as having a higher priority. In this example, an eye tracking apparatus may generate a reconstructed image using a portion ($A_0$ to $A_m$) having relatively high priorities, among principal component vectors ($A_0$ to $A_n$) corresponding to the input image.

Referring to FIG. 3, the eye tracking apparatus may determine a difference between the input image and the reconstructed image (S320). For example, the eye tracking apparatus may determine a difference value by comparing corresponding pixels of the input image and the reconstructed image. Greater coefficients of respective noise components removed in the eye reconstruction process may indicate that there is a lot of noise in the input image, and in this example, the difference between the input image and the reconstructed image may be determined to be greater. Thus, the possibility of the reconstructed image or the replacement image to be utilized as a target image may increase.

The difference value may be determined based on an eye region. For example, the eye tracking apparatus may determine the difference value by comparing corresponding pixels of an eye region of the input image and an eye region of the reconstructed image. A comparison of changes in the eye regions may be effective in utilizing the reconstructed image or the replacement image, when compared to a comparison of changes in the entire images caused by the eye reconstruction.

For example, eye tracking may be possible if a user is wearing a mask, whereas eye tracking may be difficult if the user is wearing sunglasses. Thus, it is highly necessary to detect a case where the user is wearing sunglasses rather than a mask, and use the reconstruction image or the replacement image as a target image in that case. In this example, the eye regions may be determined based on eye detection regions or eye tracking regions.

The eye tracking apparatus may compare the difference value to a first threshold (S330). If the difference value is less than the first threshold, the eye tracking apparatus may determine the input image to be a target image (S340). If the difference value is greater than the first threshold, the eye tracking apparatus may compare the difference value to a second threshold (S350). If the difference value is less than the second threshold, the eye tracking apparatus may determine the reconstructed image to be the target image (S360). If the difference value is greater than the second threshold, the eye tracking apparatus may select a replacement image from among sample images (S370). The eye tracking apparatus may determine the replacement image to be the target image (S380). After the target image is determined, the eye tracking apparatus may perform eye tracking on the target image (S390).

Figure 6:
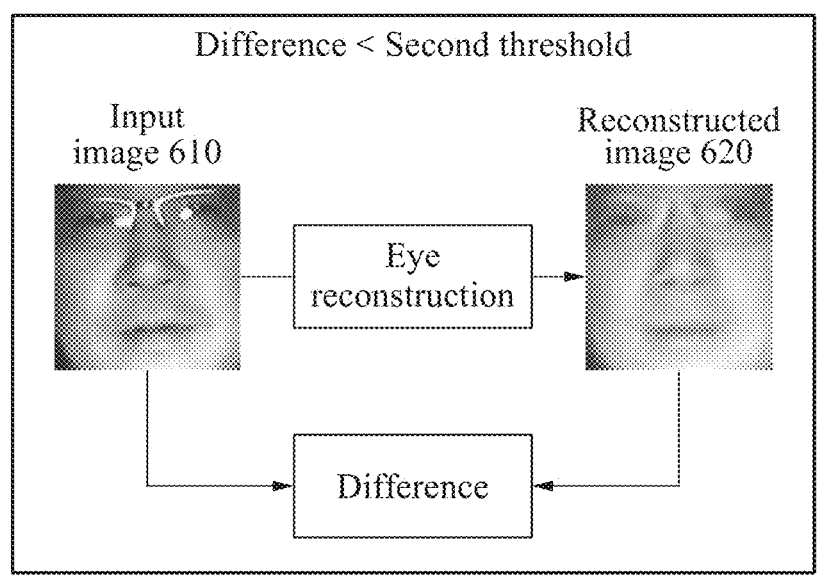
FIG. 6 illustrates an operation of selecting a target image if a difference value is less than a second threshold according to an example embodiment.

FIG. 6 illustrates an operation of selecting a target image if a difference value is less than a second threshold according to an example embodiment. Referring to FIG. 6, a reconstructed image 620 may be generated by eye reconstruction with respect to an input image 610. Through the eye reconstruction, a high-frequency component including light reflection of glasses may be removed from the input image 610, and the reconstructed image 620 may be represented to be relatively smooth, when compared to the input image 610.

After the eye reconstruction, a difference value between the input image 610 and the reconstructed image 620 may be determined. If the difference value is less than a first threshold, the input image 610 may be determined to be a target image. If the difference value is greater than the first threshold and less than a second threshold, the reconstructed image 620 may be determined to be the target image. For example, since the high-frequency component included in the input image 610 was removed, the reconstructed image 620 may be determined to be the target image.

Figure 7:
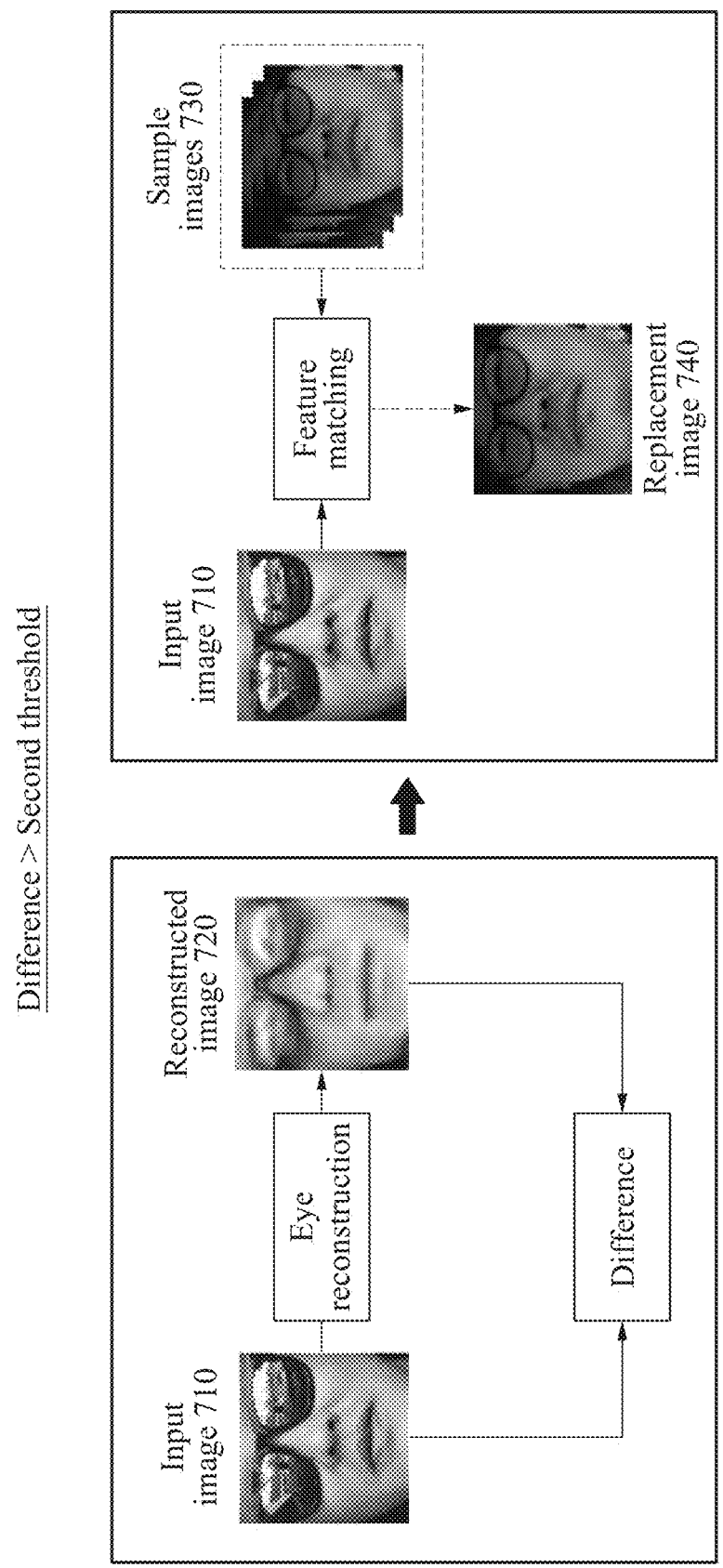
FIG. 7 illustrates an operation of selecting a target image if a difference value is greater than a second threshold according to an example embodiment.

FIG. 7 illustrates an operation of selecting a target image if a difference value is greater than a second threshold according to an example embodiment. Referring to FIG. 7, a reconstructed image 720 may be generated by eye reconstruction with respect to an input image 710. Through the eye reconstruction, a high-frequency component including light reflection of sunglasses and an occlusion component including the sunglasses may be removed from the input image 710, and the reconstructed image 720 may be represented to be relatively smooth, when compared to the input image 710.

After the eye reconstruction, a difference value between the input image 710 and the reconstructed image 720 may be determined. If the difference value is less than a first threshold, the input image 710 may be determined to be a target image. If the difference value is greater than the first threshold and less than a second threshold, the reconstructed image 720 may be determined to be the target image. If the difference value is greater than the second threshold, a replacement image 740 may be generated. For example, since the high-frequency component and the occlusion component included in the input image 710 were removed, the difference value may be determined to be greater than the second threshold.

In this example, feature matching may be performed between the input image 710 and each of sample images 730, and a sample image most similar to the input image 710 may be selected among the sample images 730, as the replacement image 740. Then, the replacement image 740 may be determined to be the target image and used for eye tracking. The sample images 730 may include various face images that are relatively easy to track eyes. For example, the sample images 730 may include a face image in which glasses are absent, and a face image in which glasses are present but there is no light reflection in the glasses. In the example of FIG. 7, a sample image in which glasses are present may be determined to be most similar to the input image 710 in which sunglasses are present, and thus the sample image may be selected as the replacement image 740.

Figure 8:
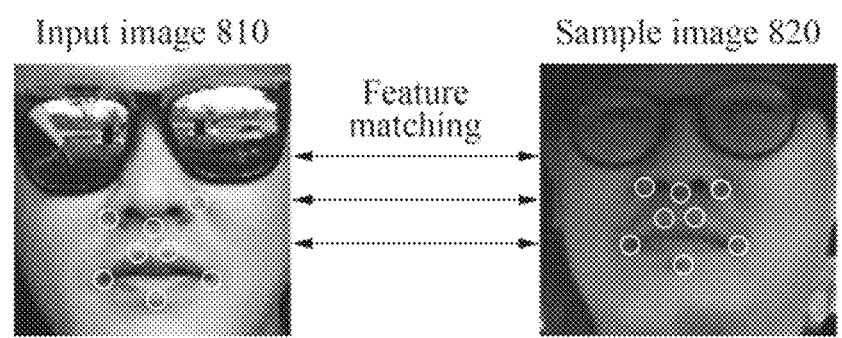
FIG. 8 illustrates an operation of matching features of an input image and features of a sample image according to an example embodiment.

FIG. 8 illustrates an operation of matching features of an input image and features of a sample image according to an example embodiment. Referring to FIG. 8, feature points of an input image 810 and feature points of a sample image 820 may be compared, and a similarity between the input image 810 and the sample image 820 may be determined. The feature points of the input image 810 and the feature points of the sample image 820 may each be extracted from a region except for eyes. For example, the feature points may be extracted from a nose, a mouth, and a face contour. A replacement image is highly likely to be used if there are sunglasses or other occlusions at positions of the eyes. Thus, extracting feature points from a region except for eyes may be advantageous in obtaining a replacement image similar to the input image 810 and obtaining an appropriate viewpoint from the replacement image.

Figure 9:
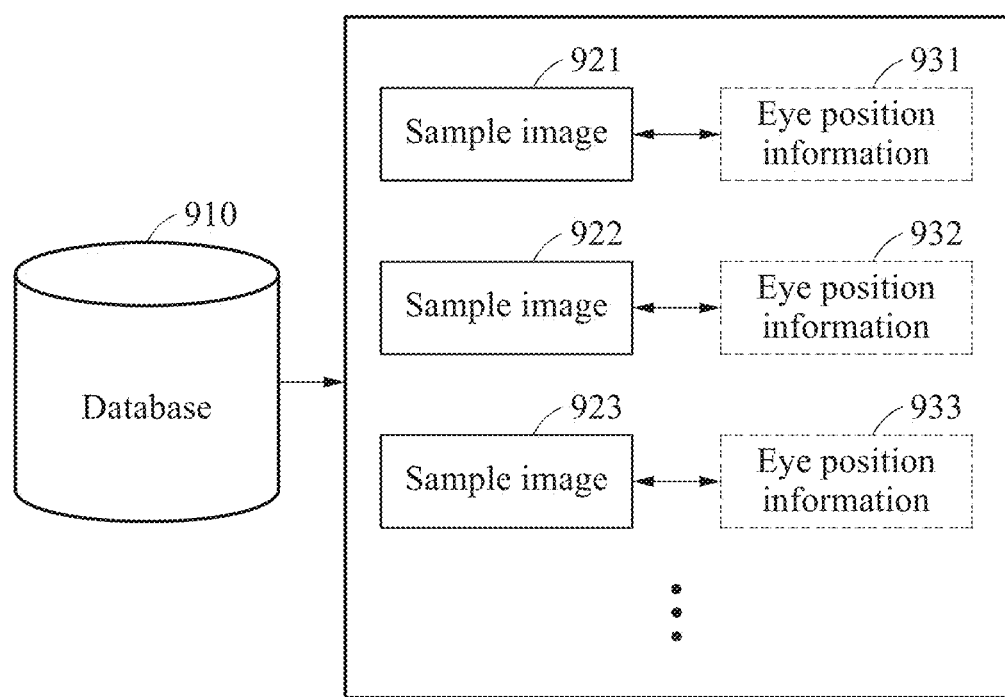
FIG. 9 illustrates sample images stored in a database according to an example embodiment.

FIG. 9 illustrates sample images stored in a database according to an example embodiment. Referring to FIG. 9, a database 910 may include sample images 921 to 923. The database 910 may be present in an eye tracking apparatus or in another apparatus different from the eye tracking apparatus. If the database 910 is present in another apparatus, the eye tracking apparatus may access the database 910 through a network to use the sample images 921 to 923. The sample images 921 to 923 may each have a state appropriate for eye tracking. The state appropriate for eye tracking may include a state in which a high-frequency component or an occlusion component is absent.

The sample images 921 to 923 may correspond to images having previously, for example, before eye tracking with respect to a current frame is performed, succeeded in eye tracking. For example, in a process of manufacturing the eye tracking apparatus, images appropriate for replacement images may be selected from among the image having succeeded in eye tracking, as the sample images 921 to 923. In another example, the sample images 921 to 923 may be images stored during a process of performing eye tracking with respect to each frame of a previous input image or a process of performing eye tracking with respect to a previous frame of a current input image. For example, if eye tracking is successful based on a current frame or a reconstructed image corresponding to the current frame, the current frame may be stored in the database 910 to be utilized as a future replacement image.

Eye position information 931 to 933 may be mapped to the sample images 921 to 923. Since the sample images 921 to 923 are those having previously succeeded in eye tracking, the eye position information 931 to 933 may be secured in relation to the sample images 921 to 923 when the eye tracking was successful previously. Thus, when the sample images 921 to 923 are utilized as replacement images, the previously secured eye position information 931 to 933 may be used, instead of separately tracking eyes in the sample images 921 to 923. For example, assuming that the sample image 921 is selected as a replacement image of the input image, the eye tracking apparatus may immediately output the eye position information 931 mapped to the sample image 921, rather than generating the eye position information by tracking the eyes in the sample image 921.

Figure 10:
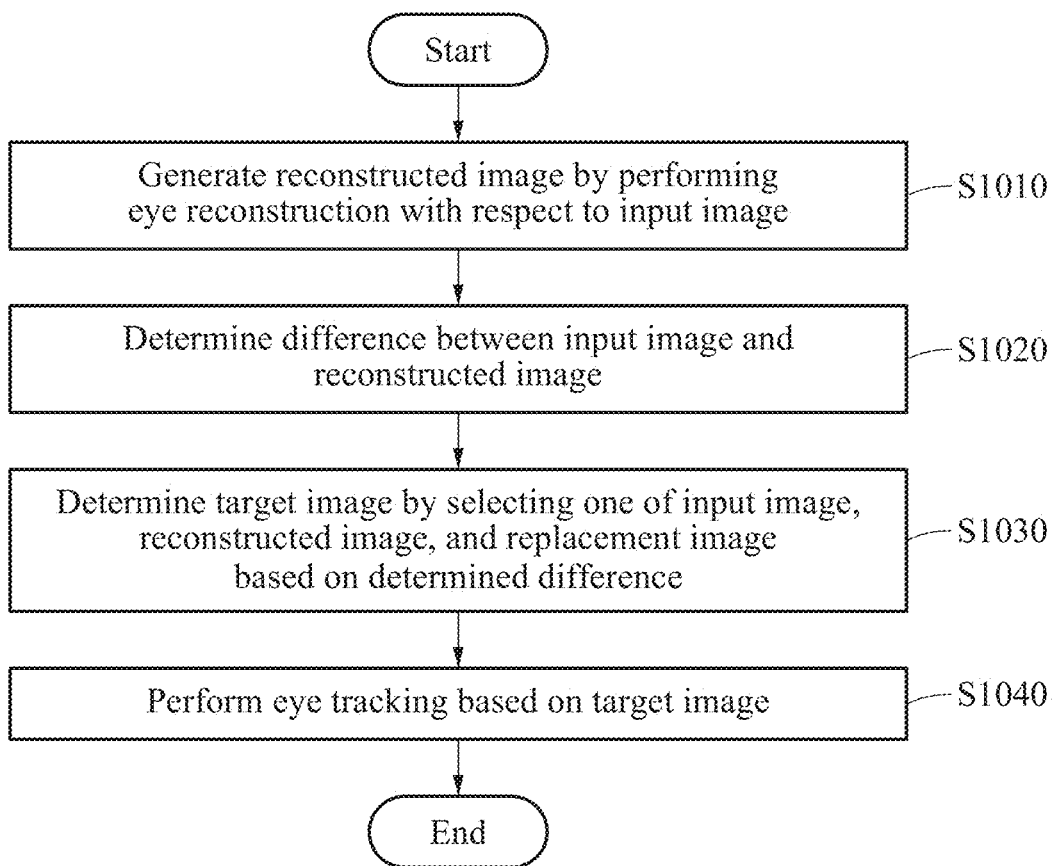
FIG. 10 is a flowchart illustrating an eye reconstruction-based eye tracking method according to an example embodiment.

FIG. 10 is a flowchart illustrating an eye reconstruction-based eye tracking method according to an example embodiment. Referring to FIG. 10, an eye tracking apparatus may generate a reconstructed image by performing eye reconstruction with respect to an input image (S1010). Then the eye tracking apparatus may determine a difference between the input image and the reconstructed image (S1020). After determining the difference, the eye tracking apparatus may determine a target image by selecting one of the input image, the reconstructed image, and a replacement image based on the determined difference (S1030). Then, the eye tracking apparatus may perform eye tracking based on the target image (S1040). In addition, the description provided with reference to FIGS. 1 through 9 may apply to the eye tracking method of FIG. 10.

Figure 11:
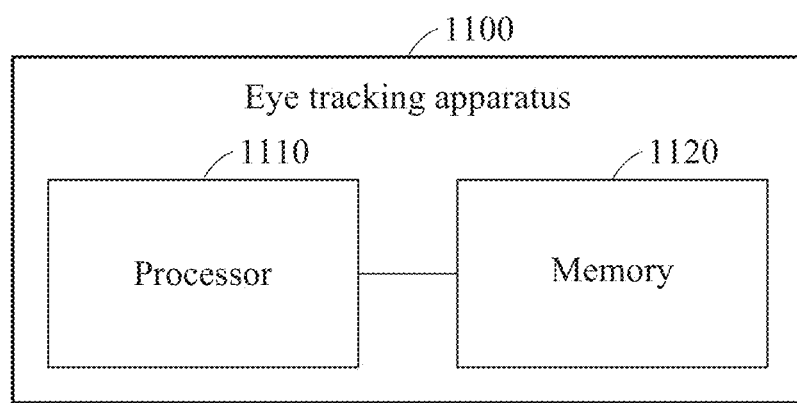
FIG. 11 is a block diagram illustrating an eye reconstruction-based eye tracking apparatus according to an example embodiment.

FIG. 11 is a block diagram illustrating an eye reconstruction-based eye tracking apparatus according to an example embodiment. Referring to FIG. 11, the eye tracking apparatus 1100 may perform at least one of the operations described or illustrated herein in relation to eye tracking, and provide eye position information to a user as a result of the eye tracking.

The eye tracking apparatus 1100 may include at least one processor 1110 and a memory 1120. The memory 1120 may be connected to the processor 1110, and store instructions executable by the processor 1110, data to be computed by the processor 1110, or data processed by the processor 1110. The memory 1120 may include a non-transitory computer-readable medium, for example, a high-speed random access memory, and/or a non-volatile computer-readable medium, for example, at least one disk storage device, flash memory device, or another non-volatile solid-state memory device.

The processor 1110 may execute instructions to perform at least one of the operations described with reference to FIGS. 1 through 10. If the instructions stored in the memory 1120 are executed by the processor 1110, the processor 1110 may generate a reconstructed image by performing eye reconstruction with respect to an input image, determine a difference between the input image and the reconstructed image, determine a target image by selecting one of the input image, the reconstructed image, and a replacement image based on the determined difference, and perform eye tracking based on the target image.

Figure 12:
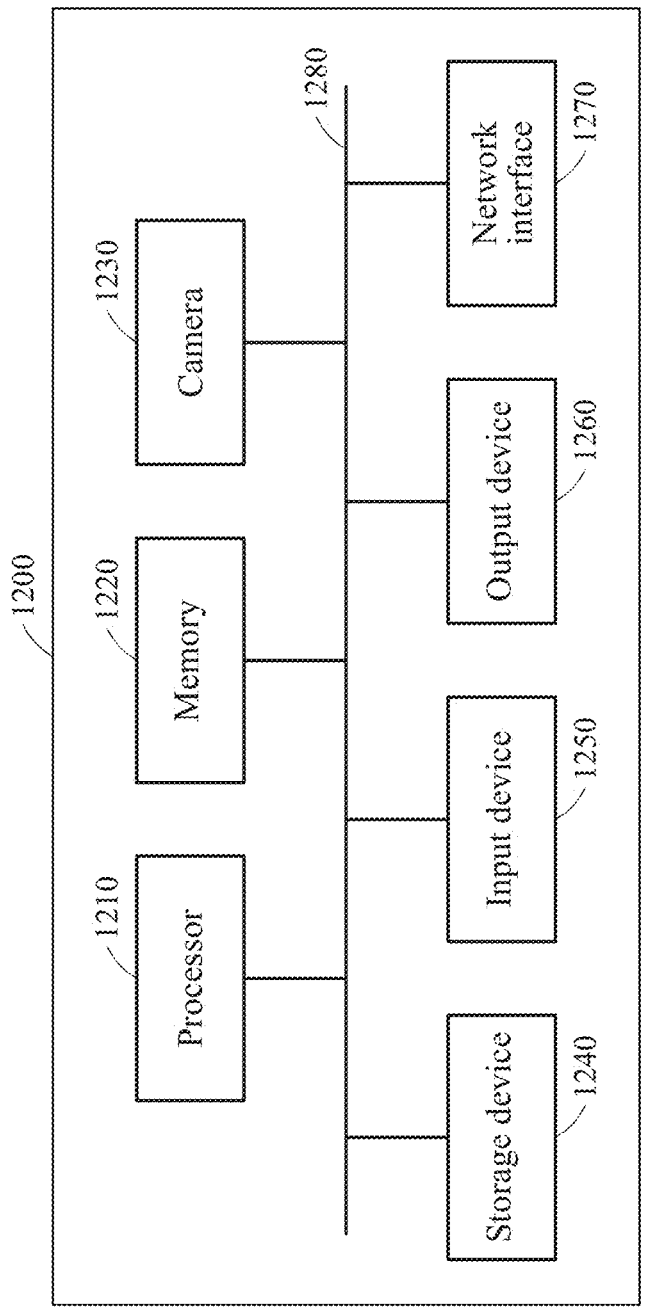
FIG. 12 is a block diagram illustrating an electronic device including an eye tracking apparatus according to an example embodiment.

FIG. 12 is a block diagram illustrating an electronic device including an eye tracking apparatus according to an example embodiment. Referring to FIG. 12, an electronic device 1200 may include the eye tracking apparatus described with reference to FIGS. 1 to 11, or perform the operations of the eye tracking apparatus described with reference to FIGS. 1 to 12.

The electronic device 1200 may include a processor 1210, a memory 1220, a camera 1230, a storage device 1240, an input device 1250, an output device 1260, and a network interface 1270. The processor 1210, the memory 1220, the camera 1230, the storage device 1240, the input device 1250, the output device 1260, and the network interface 1270 may communicate with each other through a communication bus 1280. For example, the electronic device 1200 may include a smart phone, a tablet PC, a notebook, a desktop PC, a wearable device, a smart home appliance, a smart speaker, and a smart car. In detail, the electronic device 1200 may be mounted on a vehicle to provide a function for three-dimensional head-up display (3D HUD).

The processor 1210 may execute the instructions and the operations to be executed in the electronic device 1200. For example, the processor 1210 may process the instructions stored in the memory 1220 or the storage device 1240. The processor 1210 may perform at least one of the operations described with reference to FIGS. 1 through 11.

The memory 1220 may store information to be used to process the operation of a neural network. The memory 1220 may include a computer-readable storage medium or a computer-readable storage device. The memory 1220 may store the instructions to be executed by the processor 1210, and store relevant information while software or an application is run by the electronic device 1200.

The camera 1230 may capture a still image, a video image, or both. The camera 1230 may capture a face of a user for eye tracking and generate an input image. The camera 1230 may provide a 3D image including depth information related to objects.

The storage device 1240 may include a computer-readable storage medium or a computer-readable storage device. The storage device 1240 may store a more quantity of information than the memory 1220 and store the information for a relatively long time. For example, the storage device 1240 may be a magnetic hard disk, an optical disk, a flash memory, a floppy disk, or another type of non-volatile memory. The storage device 1240 may include the database 910 of FIG. 9.

The input device 1250 may receive an input from the user through, for example, a keyboard or a mouse, a touch input, a voice input, and an image input. For example, the input device 1250 may include a keyboard, a mouse, a touch screen, a microphone, or any device configured to detect an input from the user and transmit the detected input to the electronic device 1200. Data such as a fingerprint, an iris, a speech, a voice, and an audio of the user may be input through the input device 1250.

The output device 1260 may provide an output of the electronic device 1200, for example, a user device, to the user through a visual, audio, or haptic channel. The output device 1260 may include, for example, a display, a touch screen, a speaker, a vibration generator, or any device configured to provide an output to the user. For example, the output device 1260 may include a display panel for implementing a 3D HUD, a 3D optical layer, for example, a parallax barrier, a lenticular lens, or a directional backlight, and an optical system, for example, a mirror or a lens. The network interface 1270 may communicate with an external device through a wired or wireless network.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory, for example, USB flash drives, memory cards, memory sticks, etc., and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While example embodiments have been described with reference to the figures, it will be apparent to one of ordinary skill in the art that various changes in form and details may be made in these examples without departing from the spirit and scope of the claims and their equivalents

What is claimed is:

1. An eye tracking method comprising:
   generating a reconstructed image by performing eye reconstruction with respect to an input image based on a principal component analysis;
   determining a difference value between at least one first pixel included in the input image and at least one second pixel included in the reconstructed image corresponding to the at least one first pixel;
   selecting a sample image having a highest similarity to the input image, among sample images stored in a database, as a replacement image;
   selecting one of the input image, the reconstructed image, and the replacement image as a target image based on the determined difference value; and
   performing eye tracking based on the target image.

2. The eye tracking method of claim 1, wherein the performing the eye reconstruction comprises reducing a noise component in the input image.

3. The eye tracking method of claim 1, wherein the generating comprises generating the reconstructed image based on a portion having a high priority among principal component vectors corresponding to the input image, and wherein each of the principal component vectors corresponds to an eigenface predetermined based on the principal component analysis on various face images.

4. The eye tracking method of claim 1, wherein the selecting comprises:
   selecting the input image as the target image based on the determined difference value being less than a first threshold;
   selecting the reconstructed image as the target image based on the determined difference value being greater than the first threshold and less than a second threshold; and
   selecting the replacement image as the target image based on the determined difference value being greater than the second threshold,
   wherein the second threshold is greater than the first threshold.

5. The eye tracking method of claim 1, wherein the replacement image is different from the input image and the reconstructed image.

6. The eye tracking method of claim 1, wherein the highest similarity is determined based on a comparison between feature points of the input image and corresponding feature points of each of the sample images.

7. The eye tracking method of claim 6, wherein the feature points of the input image and the corresponding feature points of each of the sample images are each extracted from a region except for eyes.

8. The eye tracking method of claim 6, wherein the sample images correspond to images having previously succeeded in eye tracking.

9. The eye tracking method of claim 1, further comprising:
   storing the input image as a sample image in the database based on the eye tracking being successful based on the input image or the reconstructed image.

10. The eye tracking method of claim 1, further comprising performing eye detection with respect to the input image,
    wherein the generating is performed based on the eye detection being successful with respect to the input image.

11. The eye tracking method of claim 1, wherein, based on the replacement image being selected as the target image, the performing eye tracking comprises performing the eye tracking based on eye position information mapped to the replacement image.

12. A non-transitory computer-readable storage medium storing instructions that, when executed by a processor, cause the processor to perform the eye tracking method of claim 1.

13. An electronic device comprising:
    a camera configured to obtain an input image of a user;
    a memory configured to store instructions; and
    a processor configured to execute the instructions to:
       generate a reconstructed image by performing eye reconstruction with respect to the input image based on a principal component analysis;
       select, as a replacement image, a sample image among sample images stored in a database that has a highest similarity to the input image;
       determine a difference value between at least one first pixel included in the input image and at least one second pixel included in the reconstructed image corresponding to the at least one first pixel;

select one of the input image, the reconstructed image, and the replacement image as a target image based on the determined difference value; and perform eye tracking on the target image.

14. An eye tracking apparatus comprising:
a memory configured to store instructions; and
a processor configured to execute the instructions to:
generate a reconstructed image by performing eye reconstruction with respect to an input image based on a principal component analysis;
determine a difference value between at least one first pixel included in the input image and at least one second pixel included in the reconstructed image corresponding to the at least one first pixel;
select a sample image having a highest similarity to the input image, among sample images stored in a database, as a replacement image;
determine a target image by selecting one of the input image, the reconstructed image, and the replacement image based on the determined difference value; and
perform eye tracking on the target image.

15. The eye tracking apparatus of claim 14, wherein the processor is further configured to generate the reconstructed image based on a portion having a high priority among principal component vectors corresponding to the input image, and
wherein each of the principal component vectors corresponds to an eigenface predetermined based on the principal component analysis on various face images.

16. The eye tracking apparatus of claim 14, wherein the processor is further configured to:
select the input image as the target image based on the determined difference value being less than a first threshold,
select the reconstructed image as the target image based on the determined difference value being greater than the first threshold and less than a second threshold, and
select the replacement image as the target image based on the determined difference value being greater than the second threshold,
wherein the second threshold is greater than the first threshold.

17. The eye tracking apparatus of claim 14, wherein the highest similarity is determined based on a comparison between feature points of the input image and corresponding feature points of each of the sample images, and
wherein the feature points of the input image and the corresponding feature points of each of the sample images are each extracted from a region except for eyes.

18. The eye tracking apparatus of claim 14, wherein, based on the replacement image being selected as the target image, the processor is further configured to perform the eye tracking based on eye position information mapped to the replacement image.

* * * * *